3,725,082
CENTRIFUGAL COFFEE ROASTING
Joseph Giacone, New Hyde Park, and Marvin Schulman, Monroe, N.Y., assignors to General Foods Corporation, White Plains, N.Y.
No Drawing. Filed May 6, 1971, Ser. No. 140,944
Int. Cl. A23f *1/02*
U.S. Cl. 99—68                                                                               4 Claims

ABSTRACT OF THE DISCLOSURE

Blends of coffee are roasted at elevated temperatures in a centrifugating vessel rotating at speeds sufficient to remove coffee oils, which are characterized by improved purity and clarity.

BACKGROUND OF THE INVENTION

Field of the invention

This invention relates to roasting coffee, and the concurrent removal of oils from said coffee during roasting. Coffee oils derived from the process of this invention are characterized by improved purity and clarity when compared to those obtained from pressing roasted coffee beans subsequent to roasting.

Description of the prior art

In the art of processing coffee for beverage consumption, the commercial practice has been geared to removing oils from the coffee beans after roasting. This removal process is performed by use of an expeller which presses the beans to squeeze out the oil. The process degrades the bean quality due to removal of materials other than oil. Moreover, these pressed degraded beans generally require pelletizing to allow an aggregation of units which are susceptible to infusion for drinking as a brew.

Apart from the lesser quality coffee oil obtained utilizing the above process, are the disadvantageous aspects of the time-consuming, two-step roast and oil removal, coupled with the necessity of employing pressing and pelletizing equipment.

SUMMARY OF THE INVENTION

It has now been discovered that a novel means for simultaneously roasting and removing oil from coffee beans is available. Thus, by exposing coffee to elevated temperatures in a centrifugating vessel, roasting and oil removal are concurrently effected in a simple, single, processing step. Neither the roasting temperatures nor the centrifugation speeds are critical; accordingly, as long as there is a concurrence of temperatures sufficient to effect roasting and angular velocity or revolutions per minutes adequate to effect oil separation, such will suffice. Consequently, variations in the temperatures and rotational speeds will merely influence roasting and oil separation times. Moreover, it is to be emphasized that the means of providing the elevated temperature environment are not critical. Thus, heat introduced by hot air, other gaseous fluids, or any other means will suffice as long as roasting is induced.

The invention is especially useful for producing coffee oils of a clarity and purity such that the oils may be utilized to enhance or impart aroma to instant coffees by employing processes heretofore known and practiced in the art.

The principal object of the invention is to provide means for simultaneously roasting coffee and removing the oils therefrom.

Another object of the invention is to produce coffee oils of improved clarity and purity.

A still further object of the invention is to eliminate the necessity of expeller and pelletizing equipment from coffee oil removal processes; while concurrently preventing coffee bean degradation prior to infusion for beverage consumption.

Other objects and advantages of the invention will become apparent in the description and example hereinafter appearing.

DETAILED DESCRIPTION OF THE INVENTION

The manner of effecting simultaneous roasting and oil separation from coffee essentially entails exposing coffee contained in a centrifugating vessel, to elevated temperature environments for a period sufficient to produce roasting and substantially remove the oils. Preferably, heat is introduced by hot air, however, any method of heating the centrifuge is sufficient, provided roasting is effected.

The invention will now be described by reference to an example.

EXAMPLE

A blend composed of Milds/Santos/Robusta green coffee beans is placed into a basket-type centrifuge. Next, heat in the form of hot air at about 400° F. is introduced while the centrifugal speed is increased to about 1500 revolutions per minute or 160 G's. After about 15 minutes under these conditions observation of the blend revealed satisfactory roasting and substantial accumulation or collection of coffee oil.

Utilizing the conditions of the example, it was found that about 150 parts by weight of the coffee blend produced about 5 parts by weight of light colored coffee oil. A comparison of this oil with oil expelled or pressed from a comparable blend after roasting disclosed that the former was clearer and purer. Moreover, these beans are now suitable for colloidal grinding (especially good with low oil content) and percolation.

While the example delineates roasting temperatures of about 400° F., it is to be noted that the roast temperature range may spread from about 275° F. to 475° F. Similarly, the angular speed or revolutions per minute utilized in centrifugation may range from about 5 to 27,000 revolutions per minute.

Although the invention has been described by reference to specific examples, it will be understood that the inventive concept is not limited thereto, and that many applications of the concept may be practiced without departing from the invention's contemplation and scope.

What is claimed is:

1. A process for removing coffee oil during roasting comprising, centrifuging coffee beans in an elevated temperature environment for a period sufficient to produce roasting at rotational speeds sufficient to separate said oil from the beans.

2. The process of claim 1, wherein the temperature environment ranges from about 275° F. to 475° F. during roasting.

3. The process of claim 1, wherein the rotation speeds are at least 1500 revolutions per minute.

4. The process of claim 1, wherein the centrifugated blend is subjected to an elevated temperature environment of air at about 400° F. for about 15 minutes.

References Cited
UNITED STATES PATENTS 3,035,922   5/1962   Mook et al. _____ 99—71
3,109,718   11/1963  Falla.

OTHER REFERENCES

Sivetz et al.: Coffee Processing Technology, vol. I, 1963, pp. 233, 234.

FRANK W. LUTTER, Primary Examiner
W. L. MENTLIK, Assistant Examiner